(12) United States Patent
Khoo et al.

(10) Patent No.: US 9,915,749 B2
(45) Date of Patent: Mar. 13, 2018

(54) SENSORS, TOOLS AND SYSTEMS CONTAINING A METALLIC FOAM AND ELASTOMER COMPOSITE

(71) Applicant: Halliburton Energy Services, Inc., Houston, TX (US)

(72) Inventors: Richard Teng Thuan Khoo, Gelugor (MY); Adan Hernandez Herrera, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 74 days.

(21) Appl. No.: 14/764,849

(22) PCT Filed: Dec. 3, 2013

(86) PCT No.: PCT/US2013/072817
§ 371 (c)(1),
(2) Date: Jul. 30, 2015

(87) PCT Pub. No.: WO2015/084326
PCT Pub. Date: Jun. 11, 2015

(65) Prior Publication Data
US 2015/0355367 A1 Dec. 10, 2015

(51) Int. Cl.
*G01V 3/08* (2006.01)
*G01V 3/12* (2006.01)
(Continued)

(52) U.S. Cl.
CPC .............. *G01V 3/26* (2013.01); *E21B 47/122* (2013.01)

(58) Field of Classification Search
CPC . G01V 1/40; G01V 1/52; G01V 1/523; G01V 1/526; G01V 3/26; G01V 13/00;
(Continued)

(56) References Cited

U.S. PATENT DOCUMENTS 3,295,628 A * 1/1967 Summers ................. G01V 1/44
367/35
5,548,116 A * 8/1996 Pandelisev ............ G01T 1/2002
250/256

(Continued)

FOREIGN PATENT DOCUMENTS

| EP | 0871901 B1 | 5/2003 |
| JP | 03-167499 A | 7/1991 |

OTHER PUBLICATIONS

D. Chen et al., "Radial Magnetometric Demagnetizing Factor of Thin Disks", IEEE Transactions on Magnetics, vol. 37, No. 6; 4 pages, Nov. 2001.

(Continued)

*Primary Examiner* — Arleen M Vazquez
*Assistant Examiner* — Steven Yeninas
(74) *Attorney, Agent, or Firm* — Baker Botts L.L.P.

(57) ABSTRACT

A logging sensor or tool including a structural component, a non-structural component, and a composite disposed between the structural component and the non-structural component. The composite may contain a metallic foam having pores and an elastomeric material deposited in the pores. The elastomeric material may include an elastomer and a plurality of metallic shield particles. A logging system and to a wireline system containing such a logging sensor or tool.

27 Claims, 5 Drawing Sheets

(51) Int. Cl.
*G01V 3/26* (2006.01)
*E21B 47/12* (2012.01)

(58) Field of Classification Search
CPC ...... E21B 47/01; E21B 47/011; E21B 47/122; B22F 3/1125; B22F 7/002; B22F 7/006
USPC .. 324/318, 750.26, 204, 260, 262, 323–375; 367/35, 816, 818
See application file for complete search history.

(56) References Cited

U.S. PATENT DOCUMENTS

| | | | |
|---|---|---|---|
| 5,644,231 | A | 7/1997 | Wignall |
| 7,994,730 | B2 | 8/2011 | Itskovich et al. |
| 8,037,765 | B2 | 10/2011 | Reiderman |
| 2001/0052427 | A1* | 12/2001 | Eppink .................. E21B 4/006 175/40 |
| 2005/0093201 | A1 | 5/2005 | Groth |
| 2007/0216416 | A1 | 9/2007 | Itkovich |
| 2008/0053705 | A1 | 3/2008 | Aronstam et al. |
| 2009/0081444 | A1 | 3/2009 | Kattannek et al. |
| 2009/0114022 | A1 | 5/2009 | Reiderman |
| 2009/0237084 | A1 | 9/2009 | Itskovich et al. |
| 2009/0255675 | A1 | 10/2009 | Casciaro |
| 2012/0090830 | A1 | 4/2012 | O'Malley et al. |
| 2012/0196147 | A1* | 8/2012 | Rabiei .................. B22F 3/1112 428/613 |
| 2013/0233610 | A1 | 9/2013 | Hansen et al. |
| 2014/0000911 | A1* | 1/2014 | Gorrara ................ E21B 43/106 166/380 |
| 2014/0008082 | A1* | 1/2014 | O'Brien ................ E21B 19/16 166/380 |
| 2014/0320134 | A1* | 10/2014 | Dorovsky ................ G01V 1/44 324/345 |

OTHER PUBLICATIONS

C. D. Graham et al., "Experimental Demagnetizing Factors for Disk Samples Magnetized Along a Diameter," IEEE Transactions on Magnetics, vol. 43, No. 6; 3 pages, Jun. 2007.
C. D. Graham et al., "Demagnetizing factors for disk samples of nonideal soft magnetic materials," Journal of Applied Physics, 107, 09A322; 4 pages, 2010.
E. Pardo et al., "Demagnetizing factors for square bars," IEEE Transactions on Magnetics, vol. 40, No. 3; 8 pages, May 2004.
International Search Report and Written Opinion, Application No. PCT/US2013/072817, 17 pages, dated Sep. 1, 2014.
Elastomeric EMI Shielding Solutions, Laird Technologies, wwwlairdtech.com, 56 pages, 2002.

* cited by examiner

SENSORS, TOOLS AND SYSTEMS CONTAINING A METALLIC FOAM AND ELASTOMER COMPOSITE

RELATED APPLICATION

This application is a U.S. National Stage Application of International Application No. PCT/US2013/072817 filed Dec. 3, 2013, which designates the United States, and which is incorporated herein by reference in its entirety.

TECHNICAL FIELD

The present disclosure relates to metallic foam and elastomer composites, to magnetic shields containing such a composite, and to electromagnetic logging sensors, tools or systems containing such a composite or magnetic shield. The present disclosure further relates to methods of forming such composites, magnetic shields, sensors, tools or systems.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

When performing subterranean operations, it is often desirable to obtain information about the formation.

The basic techniques for electromagnetic logging for earth formations are well known. For instance, induction logging to determine resistivity (or its inverse, conductivity) of earth formations adjacent a borehole has long been a standard and important technique in the search for and recovery of hydrocarbons. Generally, a transmitter transmits an electromagnetic signal that passes through formation materials and induces a signal in one or more receivers. The properties of the signal received, such as its amplitude and/or phase, are influenced by the formation resistivity, enabling resistivity measurements to be made. The measured signal characteristics and/or formation properties calculated therefrom may be recorded as a function of the tool's depth or position in the borehole, yielding a formation log that can be used to analyze the formation.

Electronic sensors, such as sensors used for electromagnetic logging for earth formations, often benefit from a magnetic shield, which protects them from magnetic and electromagnetic effects that may interfere with sensor function. The benefits of magnetic shields increase with the sensitivity of the shielded sensor.

Metals are often a component of magnetic shields, due to their inherent abilities to block or dampen magnetic effects. Shields formed entirely or largely from metal, however, may not provide additional benefits in some applications.

For example, in the conditions found downhole, magnetic shields formed entirely or largely from metal cannot be used between as structural component and a non-structural component and cannot be used as a vibration damper because of the high stiffness of such shields.

Multi-functional magnetic shields are needed for downhole logging operations.

BRIEF DESCRIPTION OF THE DRAWINGS

A more complete understanding of certain embodiments of the present disclosure may be acquired by referring to the following description taken in conjunction with the accompanying drawings, in which like numerals represent like features and in which.

DETAILED DESCRIPTION

The present disclosure relates to metallic foam and elastomer composites, to magnetic shields containing such a composite, and to electromagnetic logging sensors, tools or systems containing such a composite or magnetic shield. The present disclosure further relates to methods of forming such composites, magnetic shields, sensors, tools or systems.

Metallic Foam and Elastomer Composites

Figure 1A:
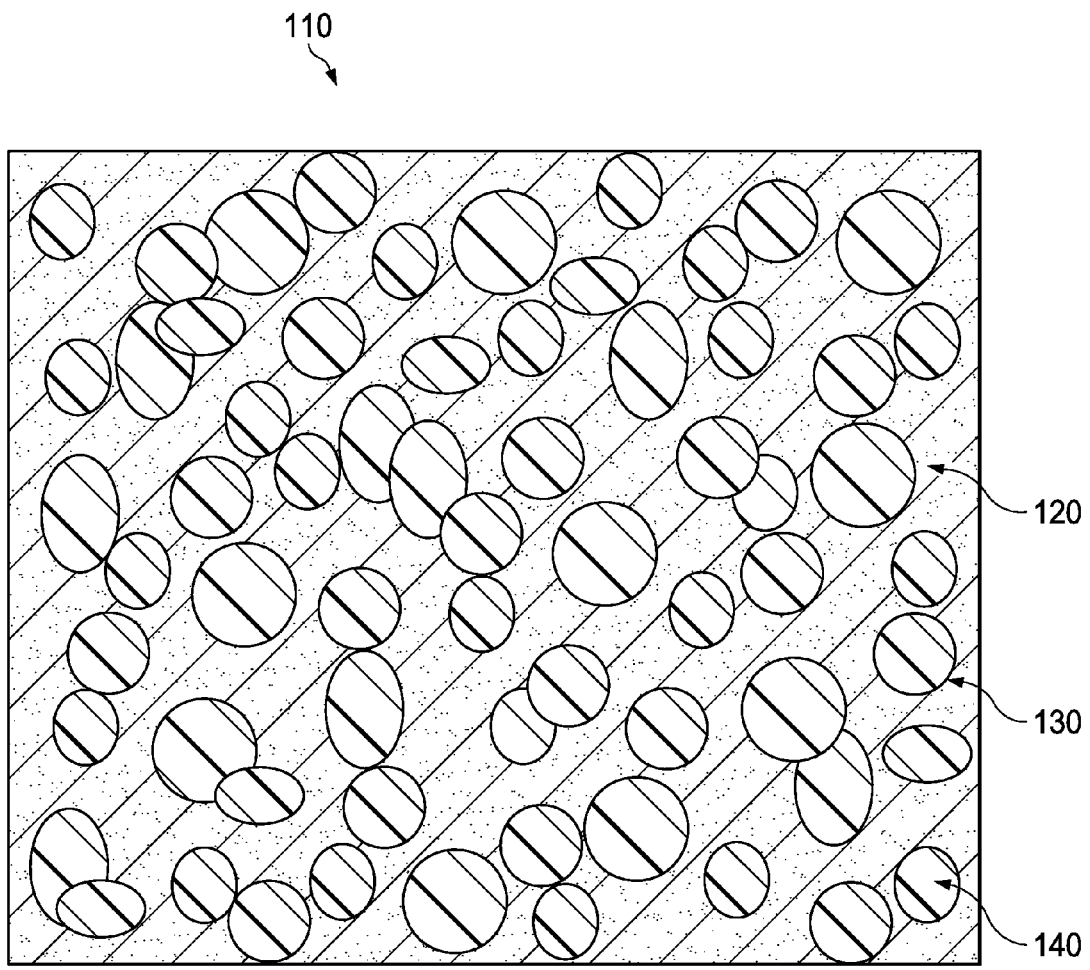
FIG. 1A is a cross-section diagram of a composite material including a metallic foam and elastomeric material.
Figure 1B:
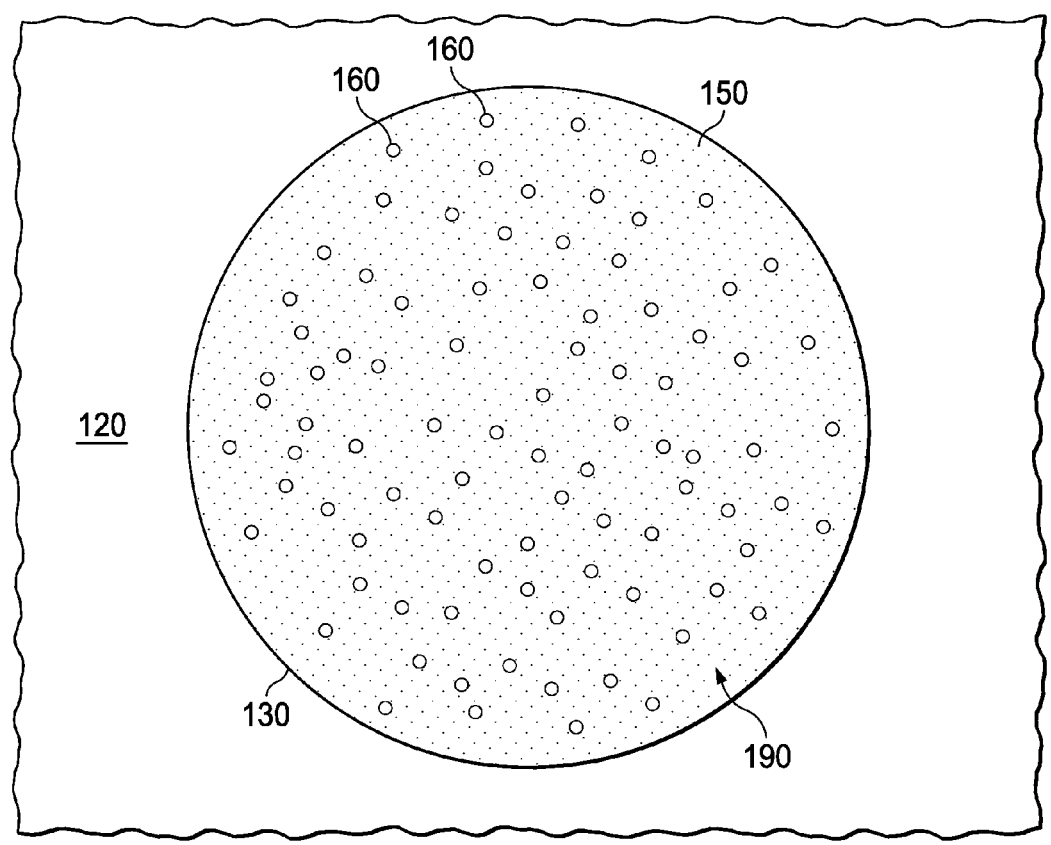
FIG. 1B is an enlarged view of a cross-section of the elastomeric material of FIG. 1A.

As illustrated in FIG. 1A, a composite 110 may include a metallic foam 120 having pores 130. An elastomeric material 140 may be located within pores 130. As illustrated in FIG. 1B, which is an enlarged view of elastomeric material 140, the elastomeric material may include elastomer 150 and a plurality of magnetic shield particles 160. It will be understood by on of ordinary skill in the art that "magnetic" includes electromagnetic properties and effects.

In some embodiments, the elastomeric material 140 may bond to the metallic foam 120 within the pores 130.

Metallic foam 120 may be formed from aluminum, stainless steel, steel, titanium, beryllium copper, nickel, cobalt-alloy, Al—SiC, or combinations thereof. It may have between 5 and 100 pores per inch (PPI). Higher PPI may be used to obtain higher shielding density. The pores may be substantially discrete, or substantially connected. Substantially connected pores may result in higher shielding density.

Elastomer 150 may include an epoxy, a polyethylene, a polyurethane, rubber, a conductive polymer, a polyetheretherketone (PEEK), a polytetrafluoroethylene (PTFE), a polyvinylidine fluoride (PVDF), a polyetherketone (PEK) or combinations thereof. Elastomer 150 may further contain a cross-linking agent. In specific embodiments, the cross-linking agent may be polymeric. Also in specific embodiments, the cross-linking agent may have viscosity suitable to allow it to flow into substantially all pores 130.

Magnetic shield particles 160 may be any size suitable to allow their movement into pores 130 when contained in elastomeric material 140. For example, magnetic shield particles may have an average diameter or an average largest dimension on a micrometer scale. In one specific embodiment, they may have an average diameter of between 10 µm and 100 µm, more specifically between 40 µm and 50 µm, such as 45 µm. Magnetic shield particles 160 may be formed from a material having sufficiently high magnetic permeability to provide a path for magnetic field lines around an area shielded by composite 110.

Example materials with high magnetic permeability that may be used with the present disclosure include Mumetal (80% Nickel (Ni), 20% Iron (Fe) and small amounts of Molybdenum (Mo) by mass. Other example materials include a 50% Ni and 50% Fe by mass alloy (50:50 NiFe) and a 10% Ni and 90% Fe by mass alloy (10:90 NiFe). When an elastomer containing epoxy and particles of the 50:50 NiFe alloy was tested for magnetic permeability, it was 29% as permeable as Mumetal. When an elastomer containing epoxy and particles of the 10:90 NiFe alloy was tested for magnetic permeability, it was 59% as permeable as Mumetal. In contrast, stainless steel, a material known for low magnetic permeability, has a permeability of only 6% that of Mumetal.

As the above test data indicates, magnetic permeability is not always strictly linked to the amount of a particular metal in an alloy. Although Mumetal contains largely Ni, an alloy of 50% Ni and 50% Fe by mass has a lower magnetic permeability than an alloy with only 10% Ni and 90% Fe by mass, indicating that Ni content does not solely contribute to magnetic permeability. Without limiting the invention to a particular theory or mode of action, combination chemistry effects and the proportions of Ni-Fe to the shielding capacity may both affect magnetic permeability of a particular alloy.

Magnetic shield particles 160 may contain only one type of particles or different types of particles (such as particles composed of different alloys) to better achieve desirable magnetic shielding effects in combination with other properties in composite 110.

Elastomeric material 140 may contain between 10-90% by volume magnetic shield particles 160. In a particular embodiment, it may contain between 5% and 15% by volume elastomer 150 and between 85% and 95% by volume magnetic shield particles 160. In a specific embodiment, elastomeric material 140 may contain 10% elastomer 150, such as an epoxy, by volume, and 90% magnetic shield particles, such as Ni—Fe particles, by volume.

Magnetic shield particles 160 may be substantially dispersed within elastomeric material 140, or they may be concentrated in certain areas, such as around the perimeter of the pores. In general, pores 130 and magnetic shield particles 160 may be of sufficient volume to allow composite 110 to block or dampen magnetic or electromagnetic effects without substantial gaps.

Method of Forming a Composite

In embodiments where pores 130 are substantially connected, elastomeric material 140 may be deposited in metallic foam 120 by flowing liquid elastomeric material 140 into metallic foam 120 and allowing it to set. In some embodiments where elastomer 150 is an epoxy, elastomeric material 140 may be formed by depositing at least two epoxy components in pores 130. Magnetic shield particles 160 may be contained in at least one epoxy component or added separately when at least one epoxy component is deposited in pores 130. In some embodiments, the epoxy components may be mixed prior to deposition in pores 130, but in other embodiments, the epoxy components may be supplied sequentially to pores 130 and allowed to mix in the pores. In some embodiments, the set epoxy may be referred to as an epoxy resin.

In other embodiments, a cross-linking agent may be used to set at least one elastomer precursor to form elastomer 150. In such embodiments, as with an epoxy, the at least one elastomer precursor and cross-linking agent may be mixed then deposited in pores 130, or supplied sequentially. Magnetic shield particles 160 may be contained in at least one elastomer precursor or in the cross-linking agent or they may be added separately when one component is deposited in the pores.

In still other embodiments in which elastomer 150 is thermally stable at temperatures at which composite 110 will be used, elastomer 150 may be heated until liquid, then deposited in pores 130. Metallic shield particles 160 may be present in elastomer 150 prior to heating deposition, or may be added during deposition.

In general, after setting, elastomer 150 may be substantially resistant to leakage from pores 130 during use of composite 110.

Sensors and Logging Tools Containing a Composite

Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a downhole tool, such as a logging tool that is made suitable for testing, retrieval and sampling along sections of the formation. Embodiments may be implemented with logging tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

Figure 2:
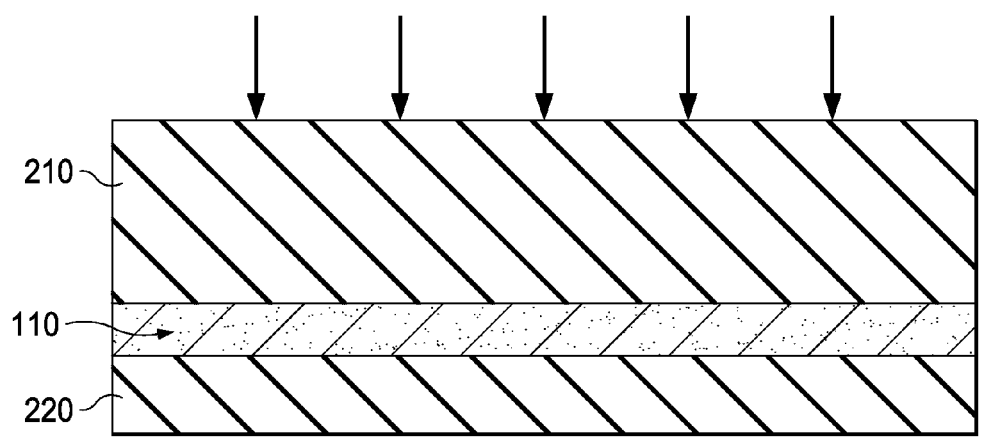
FIG. 2 is a cross-section diagram of a magnetic shield containing a composite material.

As illustrated in FIG. 2, composite 110 may be used in a logging sensor or tool by placing it between a structural component 210 and a non-structural component 220. In one embodiment, the structural component may be a pressure housing. In another embodiment, the non-structural component 220 may include a chassis for an electronic component. In use, external pressure may be applied to the structural component 210.

This configuration allows the composite 110 to be used as an electronic conductor, to remove heat from electronic components, to function as a magnetic shield for electronic components, to function as a vibration damper, to relieve or eliminate load transfer between structural component 210 and non-structural component 220, or to perform any two, three, four or all five of these functions. In particular, the magnetic shield function may improve the resistance reading in the borehole. When used in an array laterolog tool, the metallic foam may perform all of these functions.

Figure 3A:
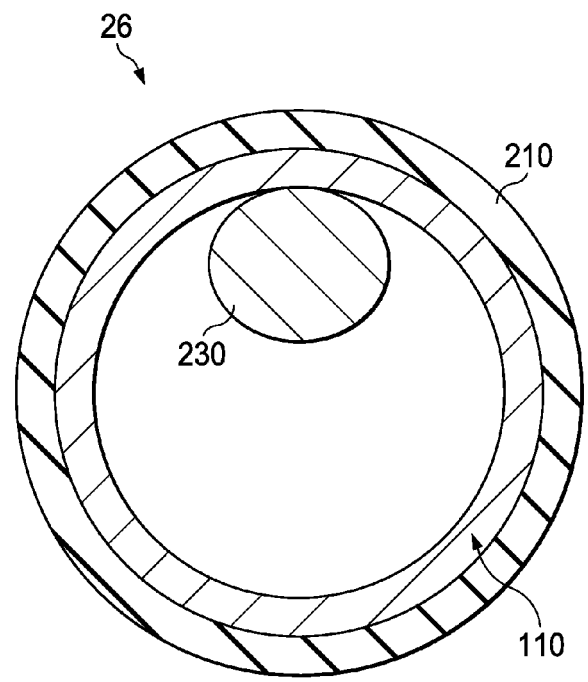
FIG. 3A is a cross-sectional diagram of a logging tool containing a magnetic shield.

As shown in further detail in FIG. 3A, logging tool 26 may include a cylindrical structural component 210 lined with composite 110. This arrangement may shield electronic component 230. Composite 110 may shield electronic component 230 from magnetic or electromagnetic effects that may interfere its function, such as a sensor function. In an alternative embodiment, not shown, composite 110 may substantially surround electrical component 230, but not line cylindrical structural component 210. In either of these embodiments, surrounding electrical component 230 with composite 110 may prevent magnetic field lines from simply moving around any magnetic shield material and affecting electrical component 230 from another direction.

Figure 3B:
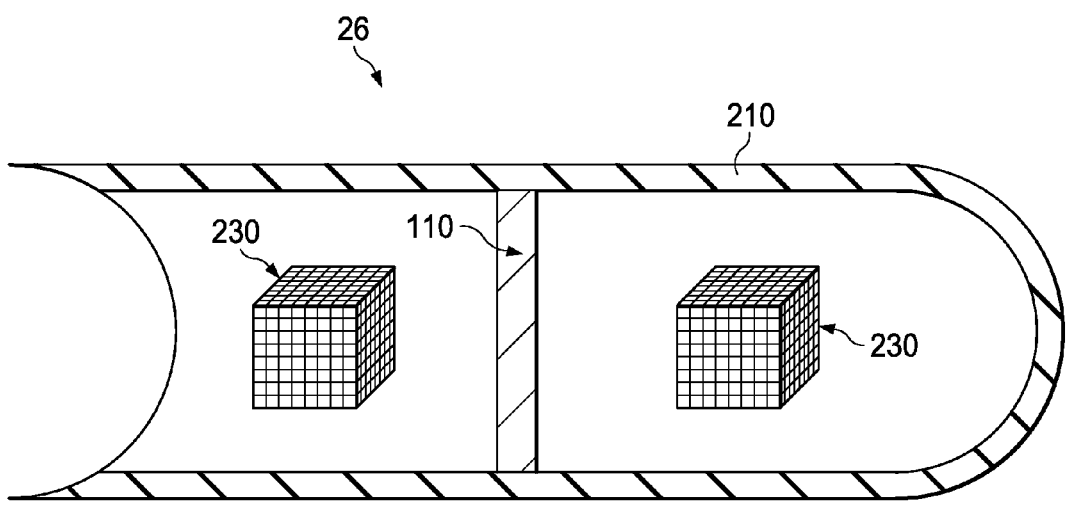
FIG. 3B illustrates a side cross-section of a logging tool containing at least two sensors and a magnetic shield between them.

As show in FIG. 3B, composite 110 may be placed between electrical components 230 to decrease or minimize electromagnetic interference of one component with another. For example, one electrical component 230 may be a transformer, which may significantly interfere with function of the other electrical component absent composite 110. In another embodiment, not shown, composite 110 may both line structural component 210 and be placed between two electrical components 230. In still another embodiment, also not shown, composite 110 may be placed between multiple or all electrical components 230 within logging tool 26.

In a specific embodiment, the logging tool 26 or electronic component 230 may include a resistivity tool. In particular, it may include an array Laterolog tool, an Array Compensated Resistivity Tool (ACRT), a Multi Component Induction Tool (MCIT), or a High Resolution Array Induction (HRAI). Composite 110 may benefit a resistivity tool by providing magnetic shielding as well as thermal and electrical conductivity. Such properties of composite 110 may be tuned by adjusting the specific composite composition to meet the requirements of a specific tool or application.

Figure 4:
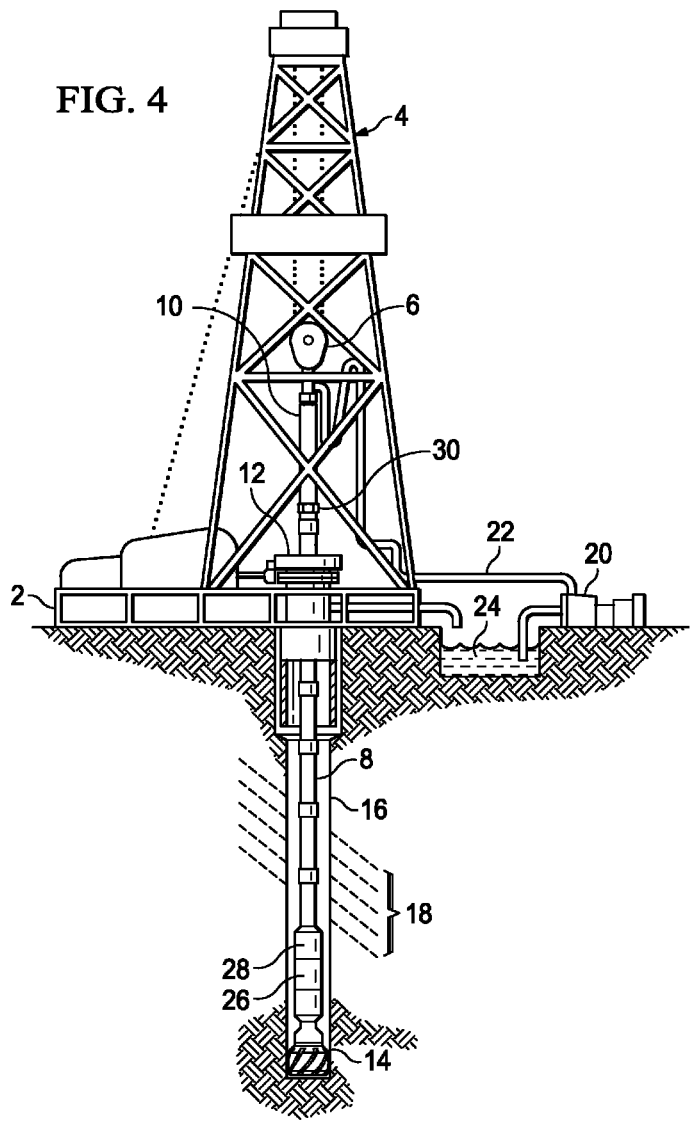
FIG. 4 is a diagram showing an illustrative logging while drilling environment.

In some embodiments, logging tool 26 may be included or used in a logging-while-drilling (LWD) environment. FIG. 4 illustrates oil well drilling equipment used in an illustrative LWD environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through one or more formations 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

A logging tool 26 may be integrated into the bottom-hole assembly near the bit 14 (e.g., within a drilling collar, i.e., a thick-walled tubular that provides weight and rigidity to aid in the drilling process, or a mandrel). In some embodiments, the logging tool 26 may be integrated at any point along the drill string 8. The logging tool 26 may include receivers and/or transmitters (e.g., antennas capable of receiving and/or transmitting one or more electromagnetic signals). In some embodiments, the logging tool 26 may include a transceiver array that functions as both a transmitter and a receiver. As the bit extends the borehole 16 through the formations 18, the logging tool 26 may collect measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used in some embodiments. In embodiments including an azimuthal orientation indicator, resistivity and/or dielectric constant measurements may be associated with a particular azimuthal orientation (e.g., by azimuthal binning) A telemetry sub 28 may be included to transfer tool measurements to a surface receiver 30 and/or to receive commands from the surface receiver 30.

Figure 5:
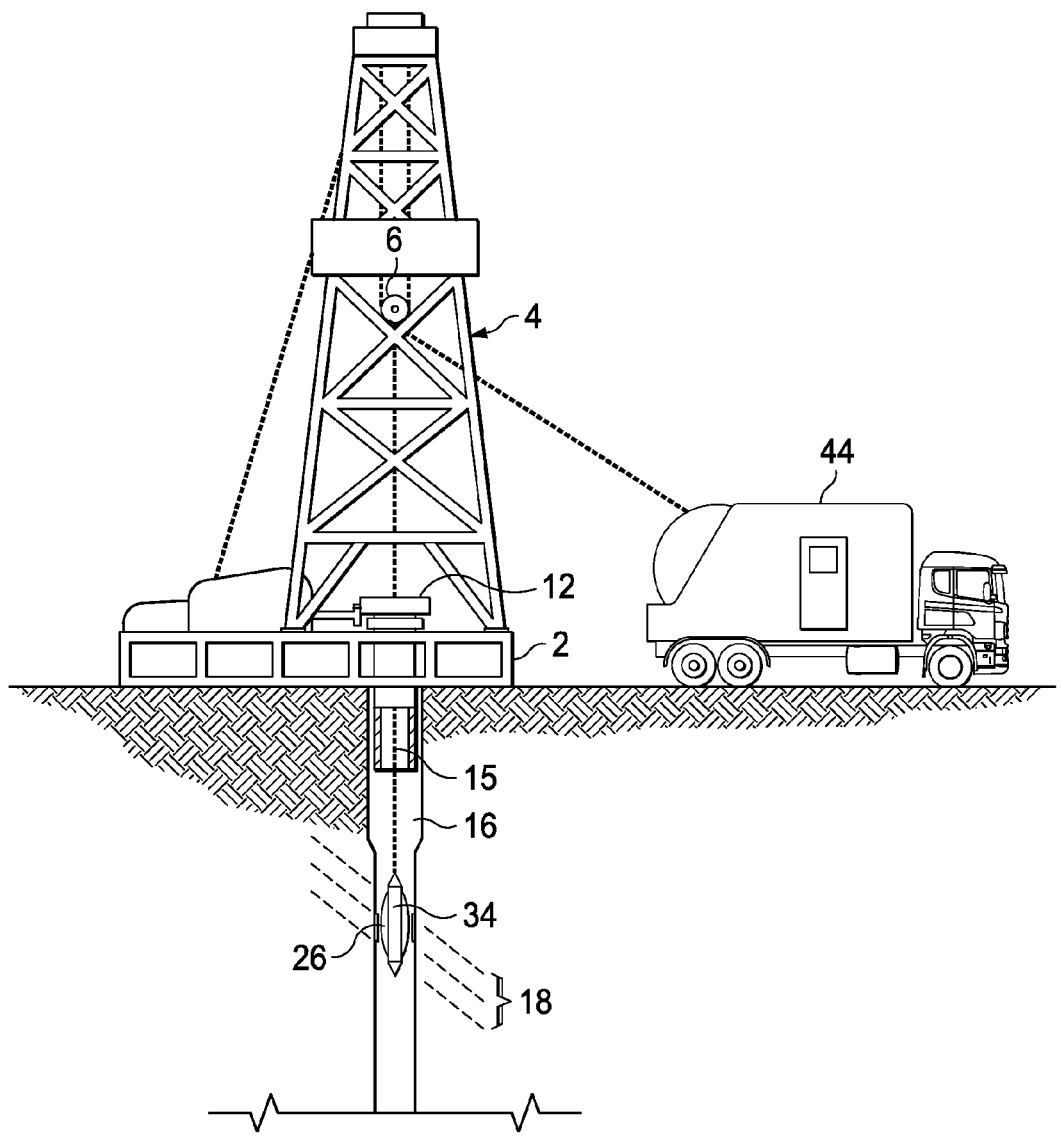
FIG. 5 is a diagram showing an illustrative wireline logging environment.

At various times during the drilling process, the drill string 8 may be removed from the borehole 16 as shown in FIG. 5. Once the drill string has been removed, logging operations can be conducted using a wireline system 34, i.e., an instrument that is suspended into the borehole 16 by a cable 15 having conductors for transporting power to the system and telemetry from the system body to the surface. The wireline system 34 may include one or more logging sensors or tools 26 according to the present disclosure. The logging sensor or tool 26 may be communicatively coupled to the cable 15. A logging facility 44 (shown in FIG. 5 as a truck, although it may be any other structure) may collect measurements from the logging sensor or tool 26, and may include computing facilities (including, e.g., an information handling system) for controlling, processing, or storing the measurements gathered by the logging sensor or tool 26. The computing facilities may be communicatively coupled to the logging sensor or tool 26 by way of the cable 15.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

The invention claimed is:

1. A logging sensor or tool comprising:
   at least one electronic component;
   a structural component;
   a non-structural component; and
   a composite disposed between the structural component and the non-structural component and shielding the electronic component, the composite comprising:
      a metallic foam having pores; and
      an elastomeric material deposited in the pores and comprising:
         at least one elastomer; and
         a plurality of metallic shield particles formed from a material having sufficiently high magnetic permeability to provide a path for magnetic field lines around the electronic component, thereby shielding the electronic component;
   wherein the composite has a magnetic permeability of at least 30% that of an 80% Nickel (Ni), 20% Iron (Fe), trace Molybdenum (Mo), by mass alloy.

2. The logging sensor or tool of claim 1, wherein the structural component comprises a pressure housing.

3. The logging sensor or tool of claim 1, wherein the non-structural component comprises a chassis for the electronic component.

4. The logging sensor or tool of claim 1, wherein at least one of the plurality of metallic shield particles comprises an alloy of 50% Nickel (Ni) and 50% Iron (Fe) by mass.

5. The logging sensor or tool of claim 1, wherein at least one of the plurality of metallic shield particles comprises an alloy of 10% Nickel (Ni) and 90% Iron (Fe) by mass.

6. The logging sensor or tool of claim 1, wherein the elastomer comprises an epoxy.

7. The logging sensor or tool of claim 1, wherein the electronic component comprises a resistivity tool.

8. The logging sensor or tool of claim 1, comprising at least two electronic components and at least one additional composite positioned between the at least two electronic components.

9. The logging sensor or tool of claim 8, wherein at least one of the at least two electronic components comprises a transformer.

10. A logging-while-drilling (LWD) system comprising:
    a bit;
    a drill string; and
    a logging sensor or tool integrated along the drill string, the logging sensor or tool comprising:
       at least one electronic component;
       a structural component;
       a non-structural component; and
       a composite disposed between the structural component and the non-structural component and shielding the electronic component, the composite comprising:
          a metallic foam having pores; and
          an elastomeric material deposited in the pores and comprising:
             at least one elastomer; and
             a plurality of metallic shield particles formed from a material having sufficiently high magnetic permeability to provide a path for magnetic field lines around the electronic component, thereby shielding the electronic component;
       wherein the composite has a magnetic permeability of at least 30% that of an 80% Nickel (Ni), 20% Iron (Fe), trace Molybdenum (Mo), by mass alloy.

11. The system of claim 10, wherein the structural component comprises a pressure housing.

12. The system of claim 10, wherein the non-structural component comprises a chassis for an electronic component.

13. The system of claim 10, wherein at least one of the plurality of metallic shield particles comprises an alloy of 50% Nickel (Ni) and 50% Iron (Fe) by mass.

14. The system of claim 10, wherein at least one of the plurality of metallic shield particles comprises an alloy of 10% Nickel (Ni) and 90% Iron (Fe) by mass.

15. The system of claim 10, wherein the elastomer comprises an epoxy.

16. The system of claim 10, wherein the electronic component comprises a resistivity tool.

17. The system of claim 10, comprising at least two electronic components and at least one additional composite positioned between the at least two electronic components.

18. The system of claim 17, wherein at least one of the at least two electronic components comprises a transformer.

19. A wireline system comprising:
    a cable; and
    a logging sensor or tool communicatively coupled to the cable, the logging sensor or tool comprising:
       at least one electronic component;
       a structural component;
       a non-structural component; and
       a composite disposed between the structural component and the non-structural component and shielding the electronic component, the composite comprising:
          a metallic foam having pores; and
          an elastomeric material deposited in the pores and comprising:
             at least one elastomer; and
             a plurality of metallic shield particles formed from a material having sufficiently high magnetic permeability to provide a path for magnetic field lines around the electronic component, thereby shielding the electronic component;
       wherein the composite has a magnetic permeability of at least 30% that of an 80% Nickel (Ni), 20% Iron (Fe), trace Molybdenum (Mo), by mass alloy.

20. The system of claim 19, wherein the structural component comprises a pressure housing.

21. The system of claim 19, wherein the non-structural component comprises a chassis for an electronic component.

22. The system of claim 19, wherein at least one of the plurality of metallic shield particles comprises an alloy of 50% Nickel (Ni) and 50% Iron (Fe) by mass.

23. The system of claim 19, wherein at least one of the plurality of metallic shield particles comprises an alloy of 10% Nickel (Ni) and 90% Iron (Fe) by mass.

24. The system of claim 19, wherein the elastomer comprises an epoxy.

25. The system of claim 19, wherein the electronic component comprises a resistivity tool.

26. The system of claim 19 comprising at least two electronic components and at least one additional composite positioned between the at least two electronic components.

27. The system of claim 26, wherein at least one of the at least two electronic components comprises a transformer.

\* \* \* \* \*